(12) United States Patent
Lv et al.

(10) Patent No.: US 12,176,623 B2
(45) Date of Patent: Dec. 24, 2024

(54) PHASE SHIFTING DEVICE AND BASE STATION ANTENNA

(71) Applicant: Suzhou Luxshare Technology Co., Ltd., Suzhou (CN)

(72) Inventors: Kangning Lv, Suzhou (CN); Zhenhua Li, Suzhou (CN); Chengyu Xu, Suzhou (CN); Wanqiang Zhang, Suzhou (CN); Zhengguo Zhou, Suzhou (CN); Gang Zhou, Suzhou (CN); Wenkai Xu, Suzhou (CN)

(73) Assignee: SUZHOU LUXSHARE TECHNOLOGY CO., LTD., Suzhou (CN)

( * ) Notice: Subject to any disclaimer, the term of this patent is extended or adjusted under 35 U.S.C. 154(b) by 192 days.

(21) Appl. No.: 17/979,417

(22) Filed: Nov. 2, 2022

(65) Prior Publication Data
US 2023/0402748 A1 Dec. 14, 2023

(30) Foreign Application Priority Data
Jun. 14, 2022 (CN) .......................... 202210666186.9

(51) Int. Cl.
*H01Q 3/12* (2006.01)
*H01Q 1/24* (2006.01)

(52) U.S. Cl.
CPC ............... *H01Q 3/12* (2013.01); *H01Q 1/246* (2013.01)

(58) Field of Classification Search
CPC ............ H01Q 3/12; H01Q 1/246; H01Q 3/32; H01Q 3/34; H01P 1/184; H01P 1/18; Y02D 30/70
See application file for complete search history.

(56) References Cited

U.S. PATENT DOCUMENTS

| 11,201,402 | B1 * | 12/2021 | Huangfu ................. H01P 1/18 |
| 2005/0046514 | A1 * | 3/2005 | Janoschka ............ H01P 1/184 333/156 |

(Continued)

FOREIGN PATENT DOCUMENTS

| CN | 102013574 A | * | 4/2011 | |
| CN | 112582799 A | * | 3/2021 | ............... H01Q 3/32 |

(Continued)

*Primary Examiner* — Ricardo I Magallanes
*Assistant Examiner* — Jordan E. DeWitt
(74) *Attorney, Agent, or Firm* — Birch, Stewart, Kolasch & Birch, LLP (57) ABSTRACT

The present disclosure provides a phase shifting device and a base station antenna. The phase shifting device comprises a driving module, a transmission rack plate, and a plurality of annular phase shifters. The driving module comprises a transmission rod. The transmission rack plate comprises a transmission nut, through which the transmission rack plate is pivotally connected to the transmission rod of the driving module. The plurality of annular phase shifters are disposed on the periphery of the transmission rack plate at intervals and are respectively engaged with the transmission rack plate. The rotation of the transmission rod drives the transmission nut to move back and forth on the transmission rod, and along with the back and forth movement of the transmission nut, the transmission rack plate drives the plurality of annular phase shifters to rotate.

8 Claims, 9 Drawing Sheets

(56) References Cited

U.S. PATENT DOCUMENTS

| | | | |
|---|---|---|---|
| 2006/0164185 A1* | 7/2006 | Tae | H01P 1/184 333/161 |
| 2010/0053008 A1* | 3/2010 | Le | H01Q 1/246 343/745 |
| 2011/0123188 A1* | 5/2011 | Cardwell | G03B 15/05 396/428 |
| 2012/0127060 A1* | 5/2012 | Oh | H01Q 3/32 343/912 |
| 2016/0049709 A1* | 2/2016 | Karikomi | H01P 1/184 333/161 |
| 2018/0287255 A1* | 10/2018 | Zimmerman | H01Q 3/08 |
| 2021/0175622 A1* | 6/2021 | Jing | H02P 27/08 |
| 2022/0029288 A1* | 1/2022 | Wang | H01Q 3/005 |
| 2022/0037783 A1* | 2/2022 | Li | H01P 1/18 |
| 2022/0336940 A1* | 10/2022 | Liu | H01Q 3/32 |
| 2022/0384948 A1* | 12/2022 | Udagave | H01Q 3/36 |
| 2023/0402748 A1* | 12/2023 | Lv | H01P 1/184 |
| 2024/0145913 A1* | 5/2024 | So | H01Q 3/30 |

FOREIGN PATENT DOCUMENTS

| | | |
|---|---|---|
| CN | 214411465 U | 10/2021 |
| CN | 214477817 U | 10/2021 |
| CN | 113972493 A | 1/2022 |

* cited by examiner

PHASE SHIFTING DEVICE AND BASE STATION ANTENNA

CROSS-REFERENCE TO RELATED APPLICATION

This application claims the priority benefit of Chinese Patent Application Serial Number 202210666186.9, filed on Jun. 14, 2022, the full disclosure of which is incorporated herein by reference.

BACKGROUND

Technical Field

The present disclosure relates to the technical field of communication, particularly to a phase shifting device and a base station antenna.

Related Art

Base station antennas provide significant connections for mobile communication systems, where the mobile communication performance in fact depends on the performance of the base station antenna. At present, the MIMO (Multi-input Multi-output) technology that uses multiple radiating units for signal transmission and reception is one of the 5G key technologies and has attracted much attention in the industry. The MIMO technology applies a large number of array antennas on a base transceiver station to achieve greater wireless data traffic and connection reliability. Compared with previous single/dual polarization antennas and 4/8 channel antennas, said large-scale antenna technology is capable of improving the utilization efficiency of spectrum and energy with different dimensions (spatial domain, time domain, frequency domain, polarization domain, etc.); 3D shaping and channel estimation technology can self-adaptively adjust phase and power of oscillators for each antenna, that significantly improves the beam pointing accuracy of the system, and focuses signal strength on specific pointing areas and specific user groups. So, while enhancing signal for users, it can significantly reduce the self-interference and adjacent-cell interference in cells, presenting an excellent technology to improve the user signal-to-carrier ratio. Thus, multi-array and miniaturized tunable electronic downtilt antennas tend to have strict requirements in structural design.

In prior arts, since phase shifters are arranged in parallel with a wide horizontal span, it is difficult for assembling, debugging, and repairing, which results in high production cost. Besides, when setting the inclination angle for conventional phase shifters, the free play in the transmission mechanism is quite large with an angle deflection, which cannot guarantee the consistency of the product. Finally, the size and mass of the products are relatively oversized as the phase shifters are required to be installed by stacking a plurality of structural components.

Therefore, the present disclosure provides a phase shifting device and a base station antenna, which can precisely synchronize during phase shifting, and at the same time can have a reliable and simple transmission design in minimum size, allowing miniaturization and lightweight for the overall device.

SUMMARY

The embodiments of the present disclosure provide a phase shifting device and a base station antenna tended to solve the problem of conventional products being in high production cost, poor consistency of quality, oversizing and over weighted by precisely synchronizing during phase shifting, and at the same time having a reliable and simple transmission design in minimum size, allowing miniaturization and lightweight for the overall device.

In a first aspect, the present disclosure provides a phase shifting device, comprising:
  a driving module comprising a transmission rod;
  a transmission rack plate comprising a transmission nut, the transmission rack plate being pivotally connected to the transmission rod of the driving module through the transmission nut; and
  a plurality of annular phase shifters disposed on the periphery of the transmission rack plate at intervals, and being engaged with the transmission rack plate respectively; wherein the transmission rod drives the transmission nut to move back and forth on the transmission rod; the transmission rack plate drives the plurality of annular phase shifters to rotate as the transmission nut moves back and forth.

In the phase shifting device of the present disclosure, the transmission rack plate is disposed at one side of the driving module. The transmission nut is disposed in a central area of the transmission rack plate.

In the phase shifting device of the present disclosure, each of the plurality of annular phase shifters comprises a phase shifter circuit board, a sliding block circuit board, a structural pressing member, and a buckling member. The phase shifter circuit board comprises a first side and a second side opposite to the first side. The structural pressing member presses the sliding block circuit board against the first side of the phase shifter circuit board. The buckling member is inserted through the second side of the phase shifter circuit board and is buckled with the structural pressing member.

In the phase shifting device of the present disclosure, the first side of the phase shifter circuit board comprises a plurality of phase shifter transmission wires. A surface of the sliding block circuit board facing the first side of the phase shifter circuit board comprises a plurality of sliding block transmission wires. When the sliding block circuit board presses against the first side of the phase shifter circuit board, the plurality of phase shifter transmission wires are coupled to the plurality of sliding block transmission wires.

In the phase shifting device of the present disclosure, the annular phase shifter engages with the transmission rack plate through the structural pressing member.

In the phase shifting device of the present disclosure, the structural pressing member comprises a geared profile.

In the phase shifting device of the present disclosure, the structural pressing member comprises a plurality of positioning columns disposed on a surface of the structural pressing piece facing the first side of the phase shifter circuit board. The sliding block transmission wire comprises a plurality of positioning holes corresponding to the plurality of positioning columns. When the structural pressing member presses the sliding block circuit board against the first side of the phase shifter circuit board, the plurality of positioning columns are secured in the plurality of positioning holes.

In the phase shifting device of the present disclosure, the plurality of positioning columns are distributed at positions away from the center of the structural pressing member. The plurality of positioning holes are distributed at positions away from the center of the sliding block circuit board.

In the phase shifting device of the present disclosure, the periphery of the transmission rack plate comprises two long edges extending along an axial direction of the transmission rod. The plurality of annular phase shifters are disposed on the two long edges of the transmission rack plate at intervals.

In a first aspect, the present disclosure provides a base station antenna, comprising:

a baseplate comprising a first surface and a second surface opposite to the first surface;

a plurality of oscillators disposed on the first surface of the baseplate; and a phase shifting device according to the first aspect, the phase shifting device being disposed on the second surface of the baseplate and being electrically connected to the plurality of oscillators.

In the embodiments of the present disclosure, the plurality of annular phase shifters are driven by the back and forth movement of the transmission rack plate to rotate, so as to adjust the coupling connection between the plurality of phase shifter transmission wires and the plurality of sliding block transmission wires in each of the annular phase shifters for precise synchronous control and product consistency. Besides, with phase shifters having an annular shape in the phase shifting device of this disclosure, it would have a reliable and simple transmission design in minimum size, allowing miniaturization and lightweight for the overall device.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
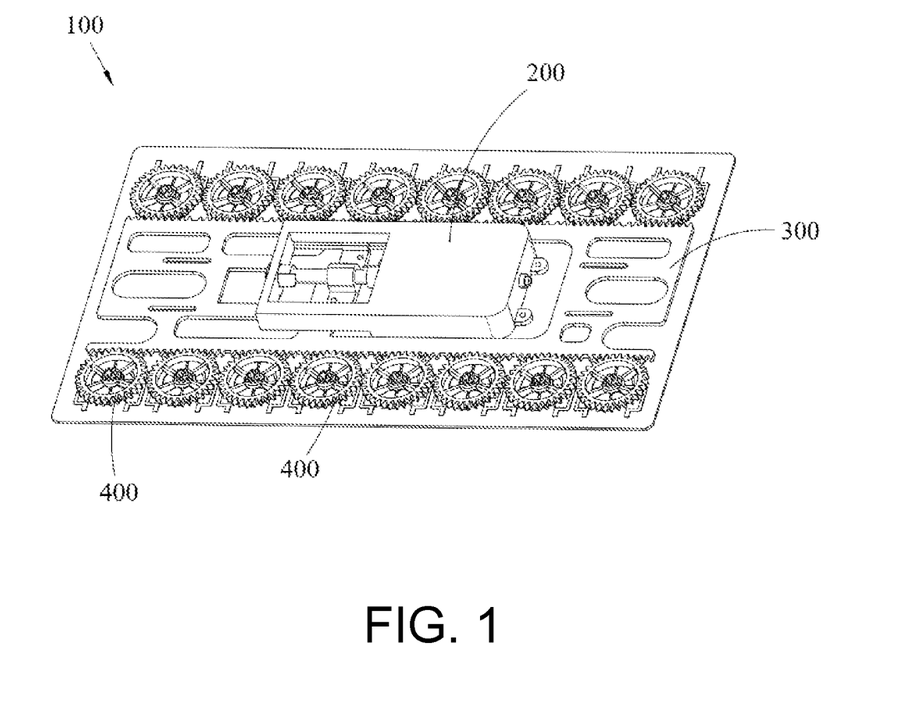
FIG. 1 is a perspective view of a phase shifting device of the present disclosure.
Figure 2:
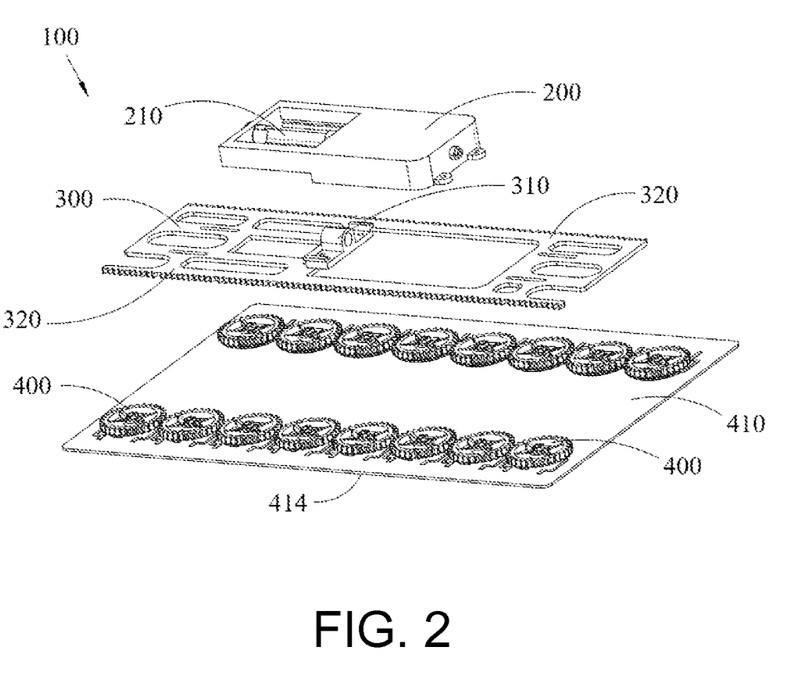
FIG. 2 is an exploded view of the phase shifting device of the present disclosure.
Figure 3:
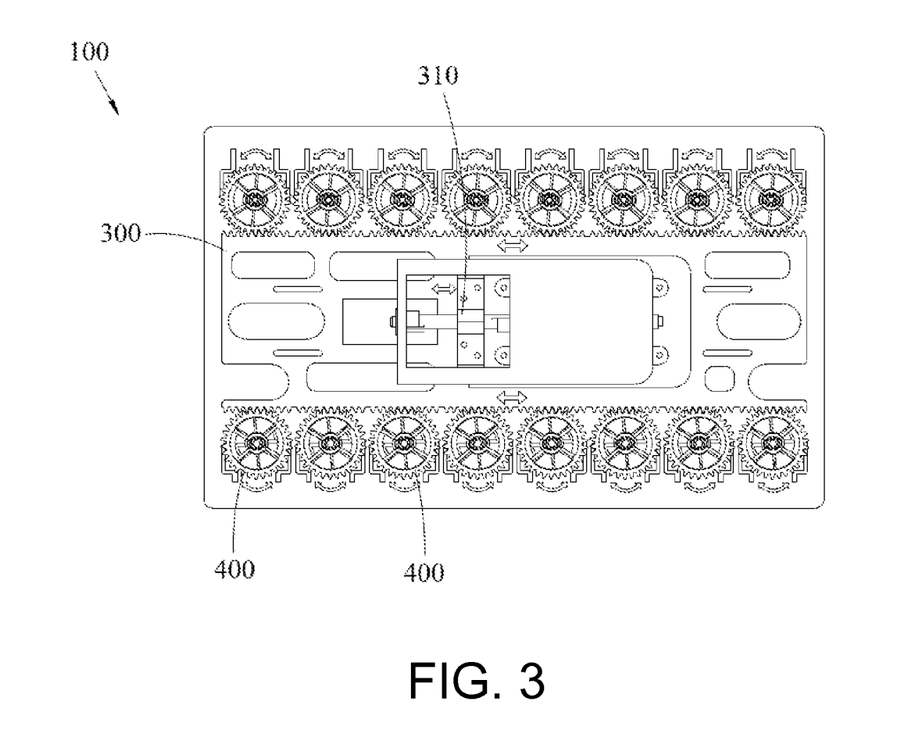
FIG. 3 is a schematic diagram showing a driving rack plate of the phase shifting device of the present disclosure driving an annular phase shifter to rotate when moving.

As shown in FIG. 1 and FIG. 2, the present disclosure provides a phase shifting device 100, which can be installed in a base station antenna 500 as described below. The phase shifting device 100 comprises a driving module 200, a driving rack plate 300, and a plurality of annular phase shifters 400. The driving module 200 comprises a transmission rod 210. The transmission rack plate 300 comprises a transmission nut 310 and is pivotally connected to the transmission rod 210 of the driving module 200 through the transmission nut 310. The plurality of annular phase shifters 400 are disposed on the periphery of the transmission rack plate 300 at intervals and are respectively engaged with the transmission rack plate 300. Wherein, as shown in FIG. 3, the transmission rod 210 drives the transmission nut 310 to move back and forth on the transmission rod 210, and along with the transmission nut 310, the moving rack plate 300 moves back and forth to drive the plurality of annular phase shifters 400 to rotate.

Referring to FIG. 1 and FIG. 2 again, the transmission rack plate 300 is disposed at one side of the driving module 200, and the transmission nut 310 is disposed in a central area of the transmission rack plate 300. So, when the transmission nut 310 is pivotally connected to the driving rod 210 from one side of the driving module 200, and when the driving module 200 is fixed on the baseplate 510 of the base station antenna 500, the transmission nut 310 would be displaced relative to the transmission rod 210 and would move back and forth along the transmission rod 210 as the transmission rod 210 is driven by a motor (not shown) installed in the driving module 200. Optionally, the transmission rack plate 300 is disposed below the driving module 200, but it is not limited thereto, which means that there would also be an embodiment that the transmission rack plate 300 being disposed above the driving module 200. At this time, the back and forth movement of the transmission nut 310 would cause the transmission rack plate 300 to move back and forth, thereby driving the plurality of annular phase shifters 400 to rotate. In this embodiment, the transmission rod 210 is a screw rod, which rotationally drives the transmission nut 310 to move back and forth, but it should not be limited thereto. In other embodiments, the transmission rod 210 may also be a push rod, which drives the transmission nut 310 by pushing back and forth when driven by the motor in the driving module 200, so the transmission nut 310 could move back and forth as the push rod is pushed back and forth.

Figure 4:
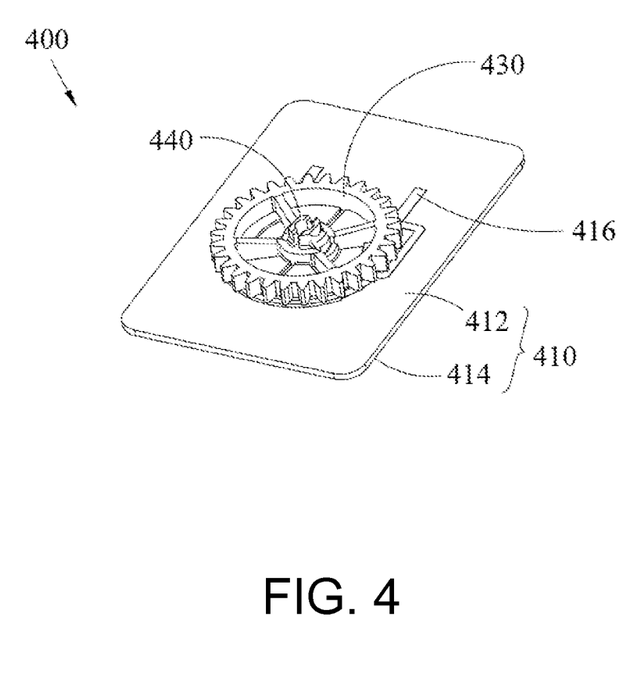
FIG. 4 is a perspective view of the annular phase shifter of the phase shifting device of the present disclosure.
Figure 5:
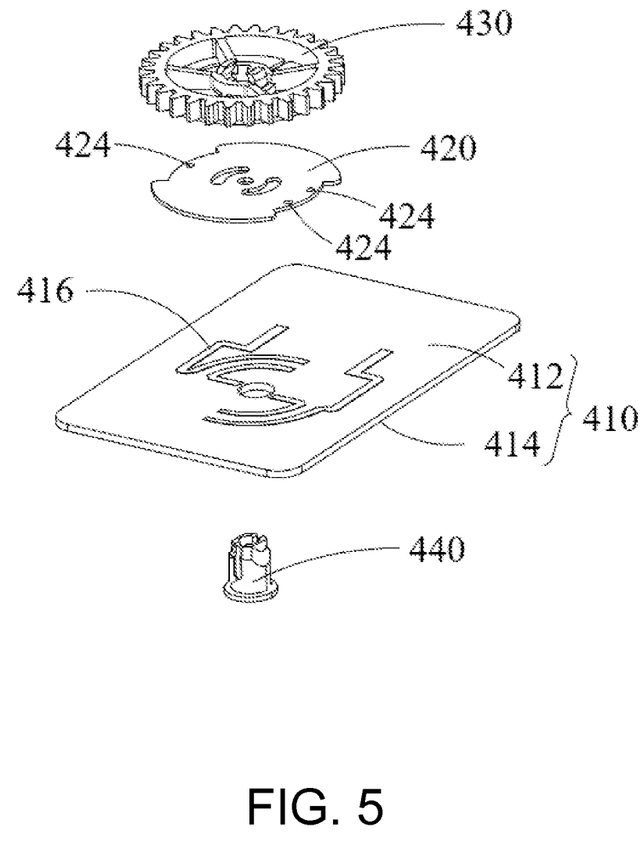
FIG. 5 is an exploded view of the annular phase shifter of the phase shifting device of the present disclosure.

Referring to FIG. 4 and FIG. 5, in the phase shifting device 100 of the present disclosure, each of the plurality of annular phase shifters 400 comprises a phase shifter circuit board 410, a sliding block circuit board 420, a structural pressing member 430, and a buckling member 440. The phase shifter circuit board 410 comprises a first side 412 and a second side 414 opposite to the first side 412. Both the structural pressing member 430 and the sliding block circuit board 420 are disposed at the first side 412 of the phase shifter circuit board 410, and the structural pressing member 430 presses the sliding block circuit board 420 against the first side 412 of the phase shifter circuit board 410. The buckling member 440 penetrates through the second side 414 of the phase shifter circuit board 410 and is buckled with the structural pressing member 430. That is, when the phase shifter circuit board 410, the sliding block circuit board 420, the structural pressing member 430, and the buckling member 440 are assembled to be the annular phase shifter 400, the sliding block circuit board 420 would be sandwiched between the phase shifter circuit board 410 and the structural pressing member 430. In addition to enabling the sliding block circuit board 420 and the structural pressing member 430 to rotate relative to the phase shifter circuit board 410, the buckling between the buckling member 440 and the structural pressing piece 430 is easy to disassemble, making it convenient for future adjustment and repair operations.

In this disclosure, there would also be an embodiment that the plurality of phase shifter circuit boards 410 of the plurality of annular phase shifters 400 may be integrated and formed as shown in FIG. 2, but it is not limited thereto.

Figure 6:
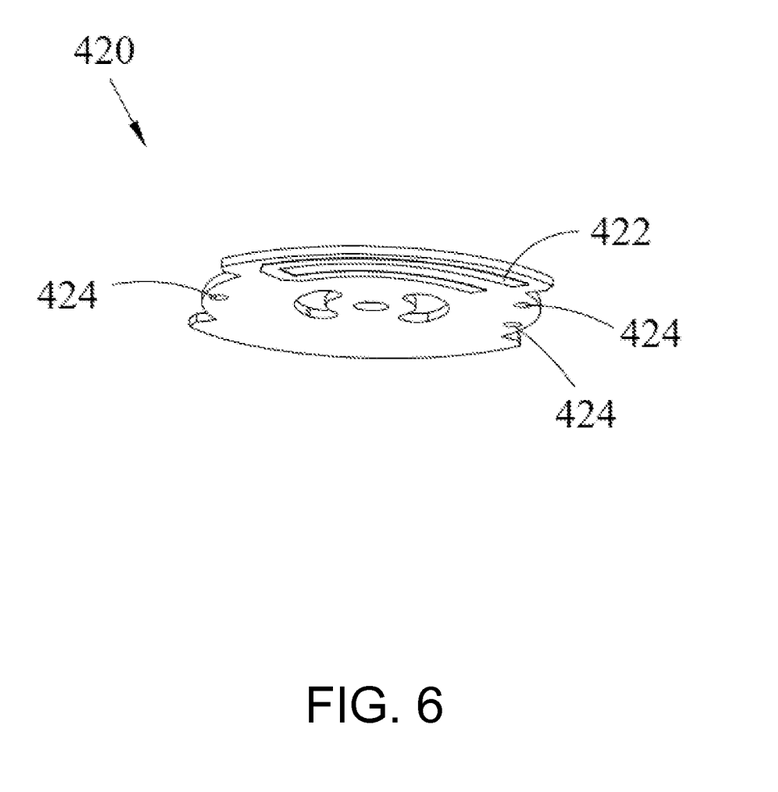
FIG. 6 is a schematic diagram of a sliding block circuit board of the annular phase shifter of the present disclosure.

The first side 412 of the phase shifter circuit board 410 comprises a plurality of phase shifter transmission wires 416 as shown in FIG. 5, and a surface of the sliding block circuit board 420 facing the first side 412 of the phase shifter circuit board 410 comprises a plurality of sliding block transmission wires 422 as shown in FIG. 6. When the sliding block circuit board 420 is pressed against the first side 412 of the phase shifter circuit board 410, the plurality of phase shifter transmission wires 416 would be coupled to the plurality of sliding block transmission wires 422. In this way, when the sliding block circuit board 420 rotates relative to the phase shifter circuit board 410, the coupling connection paths between the plurality of phase shifter transmission wires 416 and the plurality of sliding block transmission wires 422 would be changed accordingly for shifting.

In the phase shifting device 100 of the present disclosure, the annular phase shifter 400 is engaged with the transmission rack plate 300 through the structural pressing member 430, and the structural pressing member 430 preferably comprises a geared profile. In other words, by cooperating the rack with the gear, in the present disclosure, the linear motion of the transmission rack plate 300 can be converted into rotational motion of the structural pressing member 430 for precise rotational control of the annular phase shifter 400.

Figure 7:
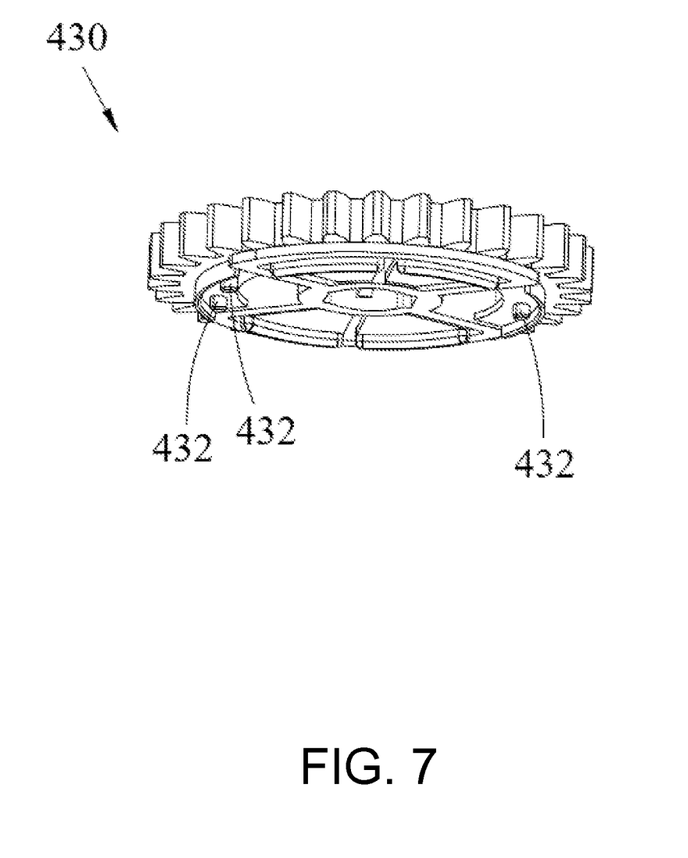
FIG. 7 is a schematic diagram of a structural pressing member of the annular phase shifter of the present disclosure.

As shown in FIG. 7, the structural pressing member 430 comprises a plurality of positioning columns 432 disposed on a surface of the structural pressing member 430 facing the first side 412 of the phase shifter circuit board 410. As shown in FIG. 6, the sliding block circuit board 420 comprises a plurality of positioning holes 424 corresponding to the plurality of positioning columns 432 of the structural pressing member 430. In this way, when the structural pressing member 430 presses the sliding block circuit board 420 against the first side 412 of the phase shifter circuit board 410, the plurality of positioning columns 432 would be respectively secured in the plurality of positioning holes 424.

Through the securing mechanism between the plurality of positioning columns 432 and the plurality of positioning holes 424, when the structural pressing member 430 is driven by the transmission rack plate 300 to rotate, the rotation of the structural pressing member 430 would simultaneously drive the sliding block circuit board 420 to rotate, achieving fine-tuning the coupling connection between the plurality of phase shifter transmission wires 416 and the plurality of sliding block transmission wires 422.

In a preferable embodiment of the present disclosure, the number of the plurality of positioning columns 432 of the structural pressing member 430 is three, which are distributed at positions away from the center of the structural pressing member 430 (i.e., at an outer edge of the structural pressing member 430). The number of the positioning holes 424 of the sliding block circuit board 420 is correspondingly three, which are correspondingly distributed at positions away from the center of the sliding block circuit board 420 (i.e., at an outer edge of the sliding block circuit board 420), but it is not limited thereto.

In another preferable embodiment, as shown in FIG. 2, the periphery of the transmission rack plate 300 comprises two long edges 320 extending along an axial direction of the transmission rod 210, and the plurality of annular phase shifters 400 are disposed at the two long edges 320 of the transmission rack plate 300 at intervals. Through this type of arrangement, the annular phase shifters 400 can be more densely installed to downsize the phase shifting device 100 for minimizing the installation space. Besides, the plurality of annular phase shifters 400 are arranged on two sides of the antenna motor (not shown) also for minimizing the installation space.

Figure 8:
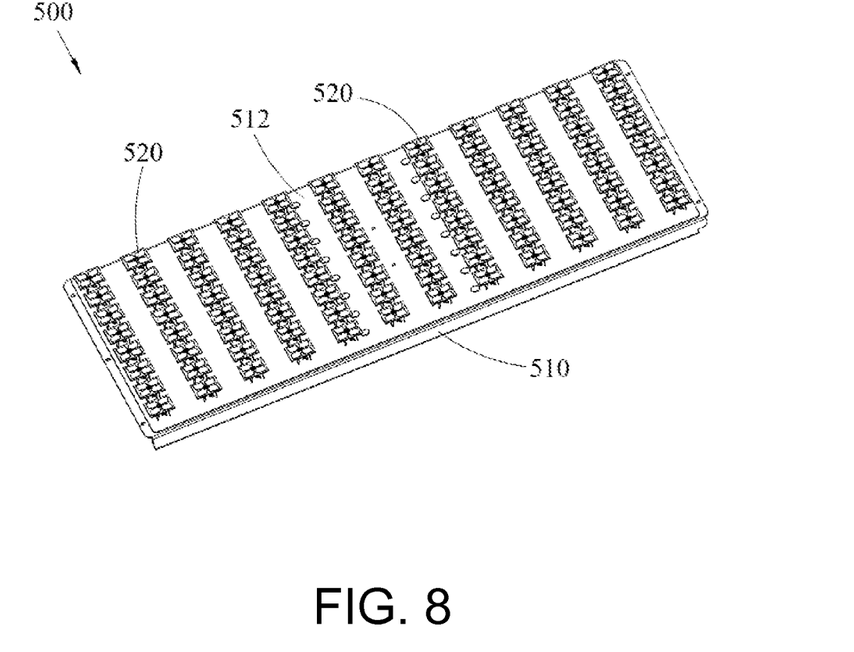
FIG. 8 is a perspective view of a base station antenna of the present disclosure.
Figure 9:
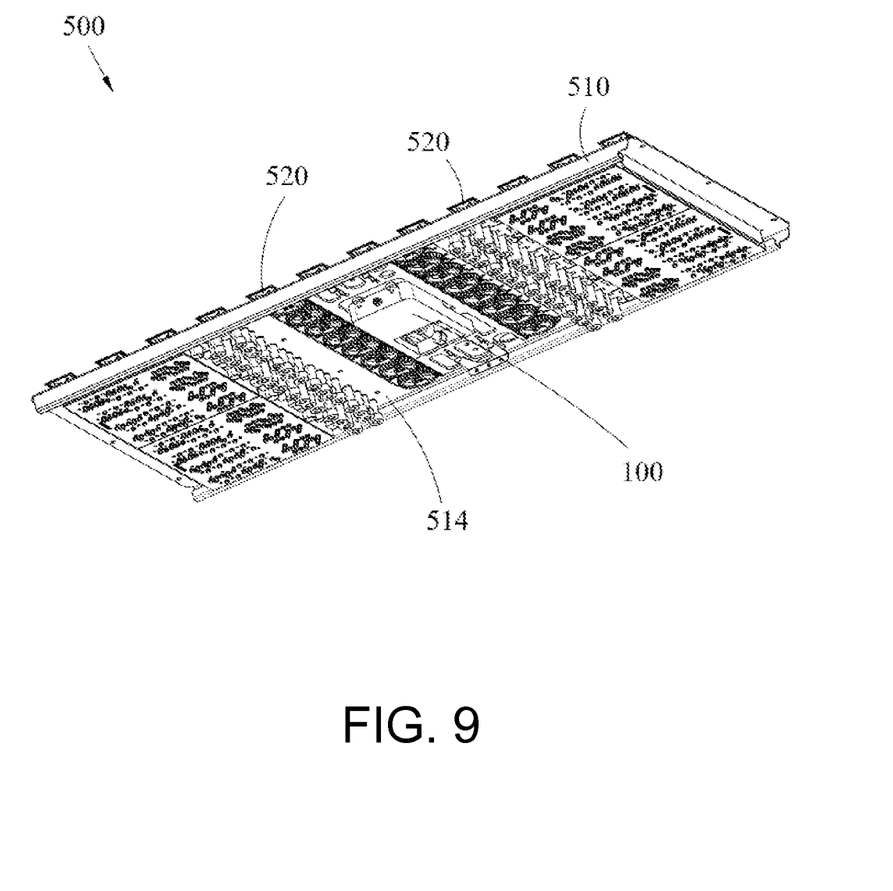
FIG. 9 is another perspective view of a base station antenna of the present disclosure.

As shown in FIG. 8 and FIG. 9, the present disclosure also provides a base station antenna 500, comprising a baseplate 510, a plurality of oscillators 520, and the phase shifting device 100 as described above, where the baseplate 510 comprises a first surface 512 and a second surface 514 disposed opposite to the first surface 512, the plurality of oscillators 520 are disposed on the first surface of the baseplate 510, and the phase shifting device 100 is disposed on the second surface 514 of the baseplate 510 and is electrically connected to the plurality of oscillators 520. According to the above configuration, the fine-tuning operation on shifting of the plurality of oscillators 520 can be controlled and adjusted by the phase shifting device 100.

As mentioned above, since the phase shifting device 100 of the present disclosure is downsized and the occupied installation space is also minimized, the size and weight of the base station antenna 500 equipped with the phase shifting device 100 can also be reduced accordingly.

In summary, in the phase shifting device 100, the plurality of annular phase shifters 400 are driven by the back and forth movement of the transmission rack plate 300 to rotate, so as to adjust the coupling connection between the plurality of phase shifter transmission wires 416 and the plurality of sliding block transmission wires 422 in each of the annular phase shifters 400 for precise synchronous control and product consistency. Besides, with phase shifters having an annular shape in the phase shifting device 100, it would have a reliable and simple transmission design in minimum size, allowing miniaturization and lightweight for the overall device. Thus, the base station antenna 500 equipped with the phase shifting device 100 would have a compact layout in components, and would also be downsized and lightweight.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A phase shifting device, comprising:
   a driving module comprising a transmission rod;
   a transmission rack plate comprising a transmission nut, the transmission rack plate being pivotally connected to the transmission rod of the driving module through the transmission nut; and
   a plurality of annular phase shifters disposed on the periphery of the transmission rack plate at intervals, and being engaged with the transmission rack plate respectively;
   wherein the transmission rod drives the transmission nut to move back and forth on the transmission rod; the transmission rack plate drives the plurality of annular phase shifters to rotate as the transmission nut moves back and forth;
   wherein each of the plurality of annular phase shifters comprises a phase shifter circuit board, a sliding block circuit board, a structural pressing member, and a buckling member; the phase shifter circuit board comprises a first side and a second side opposite to the first side; the structural pressing member presses the sliding block circuit board against the first side of the phase shifter circuit board; the buckling member is inserted through the second side of the phase shifter circuit board and is buckled with the structural pressing member;
   wherein the structural pressing member comprises a plurality of positioning columns disposed on a surface of the structural pressing piece facing the first side of the phase shifter circuit board; the sliding block circuit board comprises a plurality of positioning holes corresponding to the plurality of positioning columns; when the structural pressing member presses the sliding block circuit board against the first side of the phase shifter circuit board, the plurality of positioning columns are secured in the plurality of positioning holes.

2. The phase shifting device according to claim 1, wherein the transmission rack plate is disposed at one side of the driving module; the transmission nut is disposed in a central area of the transmission rack plate.

3. The phase shifting device according to claim 1, wherein the first side of the phase shifter circuit board comprises a plurality of phase shifter transmission wires; a surface of the sliding block circuit board facing the first side of the phase shifter circuit board comprises a plurality of sliding block transmission wires; when the sliding block circuit board presses against the first side of the phase shifter circuit board, the plurality of phase shifter transmission wires are coupled to the plurality of sliding block transmission wires.

4. The phase shifting device according to claim 1, wherein the annular phase shifter engages with the transmission rack plate through the structural pressing member.

5. The phase shifting device according to claim 4, wherein the structural pressing member comprises a geared profile.

6. The phase shifting device according to claim 1, wherein the plurality of positioning columns are distributed at positions away from the center of the structural pressing member; the plurality of positioning holes are distributed at positions away from the center of the sliding block circuit board.

7. The phase shifting device according to claim 1, wherein the periphery of the transmission rack plate comprises two long edges extending along an axial direction of the transmission rod; the plurality of annular phase shifters are disposed on the two long edges of the transmission rack plate at intervals.

8. A base station antenna, comprising:
   a baseplate comprising a first surface and a second surface opposite to the first surface;
   a plurality of oscillators disposed on the first surface of the baseplate; and
   a phase shifting device according to claim 1, the phase shifting device being disposed on the second surface of the baseplate and being electrically connected to the plurality of oscillators.

* * * * *